United States Patent [19]
Schmidt

[11] Patent Number: 6,057,018
[45] Date of Patent: May 2, 2000

[54] BLEND OF NON PLASTICIZED POLYVINYL CHLORIDE AND ETHER-BASED POLYURETHANE

[75] Inventor: Ilona W. Schmidt, Coburg, Germany

[73] Assignee: Siecor Corporation, Hickory, N.C.

[21] Appl. No.: 08/281,816

[22] Filed: Jul. 28, 1994

[51] Int. Cl.[7] .............................. B29D 22/00; G02B 6/44
[52] U.S. Cl. .................... 428/36.9; 428/36.91; 428/625; 428/626; 385/100; 385/101; 385/102; 385/109; 525/131
[58] Field of Search ................................ 428/36.91, 36.9, 428/625, 626; 385/100, 102, 109, 101; 525/131

[56] References Cited

U.S. PATENT DOCUMENTS

| | | |
|---|---|---|
| 3,926,883 | 12/1975 | Touval . |
| 4,350,792 | 9/1982 | Goswami et al. . |
| 4,596,743 | 6/1986 | Brauer et al. ............................. 428/380 |
| 4,621,113 | 11/1986 | Collins . |
| 4,638,019 | 1/1987 | Gentzkow et al. . |
| 4,739,031 | 4/1988 | Goel . |
| 4,956,039 | 9/1990 | Olesen ................................... 156/180 |
| 5,096,756 | 3/1992 | Walters ................................. 428/35.5 |
| 5,166,271 | 11/1992 | Masuko et al. . |

*Primary Examiner*—Patricia A. Short
*Attorney, Agent, or Firm*—Timothy J. Aberle

[57] ABSTRACT

A telecommunications cable includes an extruded plastic member formed of an extruded blend of a nonplasticized polyvinyl chloride and an ether-based polyurethane. The blend may be used in the extrusion of tubes or ribbons holding light waveguides or metallic conductors.

6 Claims, 1 Drawing Sheet

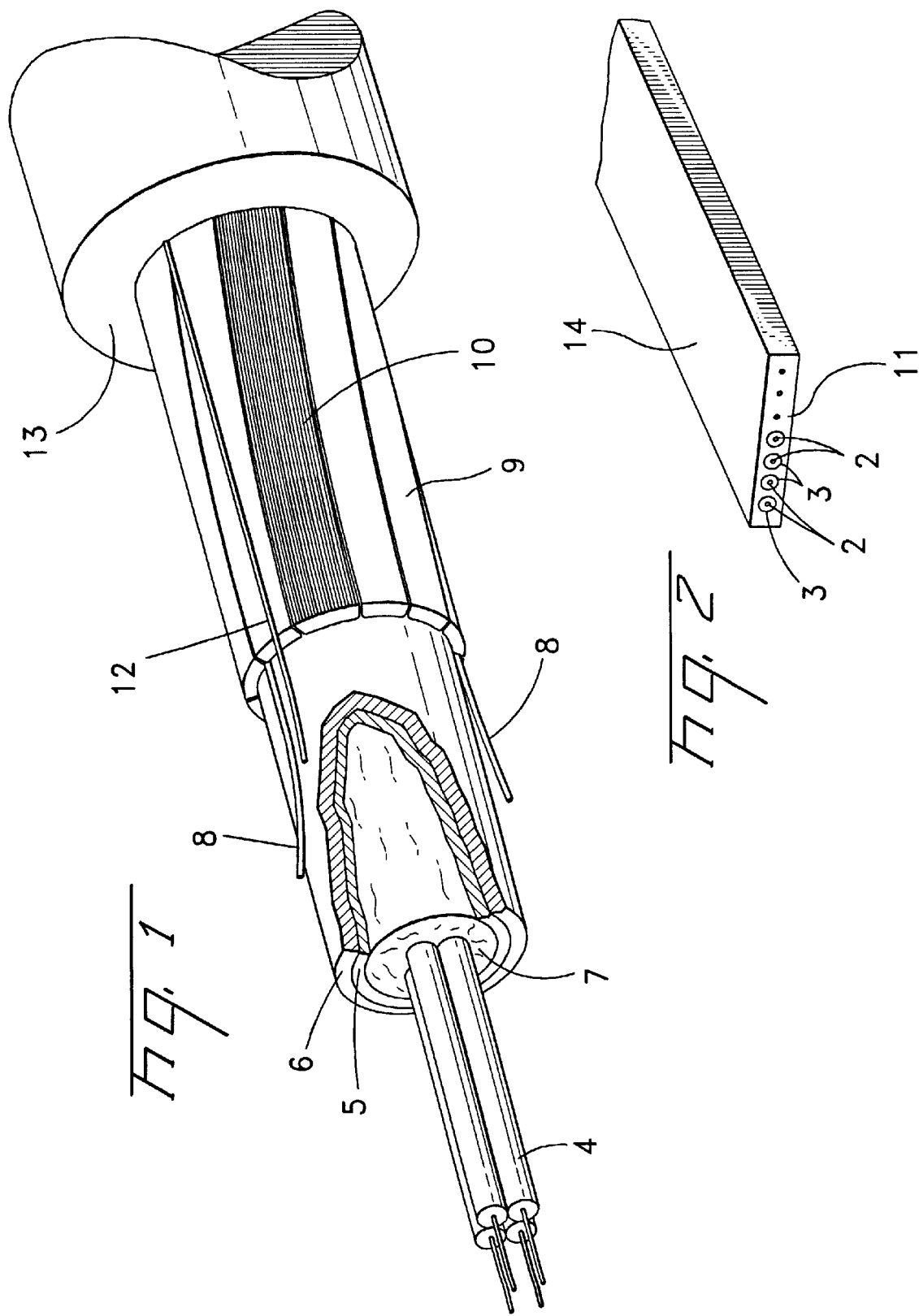

BLEND OF NON PLASTICIZED POLYVINYL CHLORIDE AND ETHER-BASED POLYURETHANE

BACKGROUND OF THE INVENTION

The field of the invention is extruded plastics, particularly as used in telecommunications cables.

Polyvinyl chlorides (PVC) containing plasticizers are well known in making tubes for telecommunications cables. However, the plasticizers have a tendency to migrate into adjacent oils or greases present in the environment or in the cables themselves performing waterblocking functions. Such migration leaves the PVC in a brittle condition. The plasticized PVC also has a limited temperature range and is subject to fungal attack, leading to proposals to add antifungal agents to the plastic blends.

Polyurethanes (PUR), also well known materials for use in telecommunications cables, have a high tackiness which leads to handling problems, mainly during respooling or the take-up process, leading to light waveguide microbending.

Garaflex GF 50-10B is a commercially available blend of PVC and ester-based PUR suitable in some applications, but still having poor fungal resistance and poor hydrolytic stability, rendering the material unsuitable for use in applications exposed to the outdoor environment.

SUMMARY OF THE INVENTION

The improved material, particularly suitable for use in cables containing telecommunications elements such as light waveguides, electrical conductors, or both, is a blend of a nonplasticized PVC and an ether-based PUR, each of the PVC and PUR materials making up from about 10% to about 90% by weight of the blend. The blend may also contain other standard additives such as light stabilizers. The blend can be used in the extrusion of outer jackets, tubes closely holding the telecommunications elements, or in matrix materials in which a plurality of telecommunications elements are embedded parallel to each other. The blend may also be used as a tight buffer coating on light waveguides.

BRIEF DESCRIPTION OF THE DRAWINGS

FIG. 1 is a perspective view of a cable according to the invention, and

FIG. 2 is a perspective view of a ribbon according to the invention.

DETAILED DESCRIPTION OF THE PREFERRED EMBODIMENTS

The cable shown in FIG. 1 contains a core of one or more telecommunications elements 4, which may be coated light waveguides or insulated conductors as desired. Telecommunications elements 4 are contained in a plastic buffer tube 5. Tube 5 may or may not be covered by a second tube 6, which may be a metal tube for electromagnetic shielding or a plastic tube as desired. Tube 6 may in turn be covered by waterblocking yarns 8 and a layer of impregnated fiberglass yarn strength members 9 and at least one bundle 10 of aramid yarns. Overlying rip cord 12 is an outer plastic jacket 13. Any of tubes 5, 6, or 13 may be made from a blend of nonplasticized PVC and ether-based PUR. The cable of FIG. 1 is suitable for use as a drop cable. The blend can also be used as a tight buffer coating on individual light waveguides.

A cable may contain electrical conductors insulated with the blend, an optional metal shield, and an outer jacket made of the blend. A water blocking compound in direct contact with the blend may optionally be used.

Ribbon unit 14 shown in FIG. 2 may be substituted for the telecommunications elements 4 of FIG. 1. Ribbon unit 14 contains two or more telecommunications elements 2 having coating 3 thereon embedded in parallel in matrix material 11, which may be a blend of nonplasticized PVC and ether-based PUR according to the invention.

It will be appreciated by those skilled in the art that the tubes and ribbons made of the novel PVC-PUR blend described herein may be used in standard design cables including those having slotted cores, loose or tight buffered cables, or cables having stacks of ribbons in U-shaped carriers. The blend can be used as insulation or outer jacket material for twisted pair cables or as outer jacket material for coaxial cables or in plastic insulated drop wire.

The tubes and ribbons utilizing the novel PVC-PUR blend described herein are formed by extruding together pellets of nonplasticized PVC and pellets of ether-based PUR, both of which pellets are commercially available. The pellets should be well blended, such as by extrusion through twin screws rotating in opposite directions.

While the ester-based PUR blend lost almost all its elongation to break after two weeks at 85 degrees C in the presence of water, the ether-based PUR blend according to the invention still retained over 50% elongation to break after sixteen weeks at 85 degrees C in the presence of water. While the ester-based PUR blend was heavily attacked by fungus in the absence of a fungicide, the ether-based PUR according to the invention displays good resistance to fungus in the absence of a fungicide. The blend according to the invention appears well suited to outdoor use applications.

What is claimed is:

1. A telecommunications cable comprising a plastic tube made of an extruded blend comprising from about 10% to about 90%, by weight of the blend, of a nonplasticized polyvinyl chloride, and from about 10% to about 90% by weight of the blend, of an ether-based polyurethane.

2. A telecommunications cable as recited in claim 1 wherein the plastic tube is an outer sheath.

3. A telecommunications cable as recited in claim 1 wherein the plastic tube contains a light waveguide.

4. A telecommunications cable as recited in claim 1 wherein the plastic tube is in direct contact with a waterblocking compound.

5. A telecommunications cable as recited in claim 4 wherein the plastic tube is an insulation for the metallic conductor.

6. A telecommunications cable as recited in claim 1 wherein the plastic tube contains a metallic conductor.

* * * * *